United States Patent [19]

Fulmer

[11] Patent Number: 4,809,821

[45] Date of Patent: Mar. 7, 1989

[54] DISC BRAKE CORROSION BARRIER

[75] Inventor: Keith H. Fulmer, Mishawaka, Ind.

[73] Assignee: Allied-Signal Inc., Morristown, N.J.

[21] Appl. No.: 752,487

[22] Filed: Jul. 5, 1985

Related U.S. Application Data

[63] Continuation of Ser. No. 550,842, Nov. 14, 1983, abandoned.

[51] Int. Cl.[4] .............................................. F16D 55/18
[52] U.S. Cl. ..................................... 188/72.4; 188/370
[58] Field of Search ..................... 188/72.4, 370, 71.8,
188/73.45, 151 A, 152, 322.18; 403/50, 51;
74/18.2; 91/389 A, 389 B; 92/168 R, 168 B;
277/212 F, 212 B, DIG. 4, DIG. 6; 267/1.5,
129; 384/299, 138, 908, 905; 308/3.5

[56] References Cited

U.S. PATENT DOCUMENTS

| 2,908,537 | 10/1959 | Kipp | 272/DIG. 6 X |
| 3,476,221 | 11/1969 | Schanz | 188/370 X |
| 3,517,782 | 6/1970 | Hayes | 188/152 |
| 3,528,301 | 9/1970 | Wasmer | 92/168 B X |
| 3,631,767 | 1/1972 | Meier | 188/370 X |
| 3,770,285 | 11/1973 | Grover | 277/DIG. 6 X |
| 4,039,053 | 8/1977 | Meyer et al. | 188/73.3 |
| 4,156,532 | 5/1979 | Kawaguchi et al. | 277/165 |
| 4,170,926 | 10/1979 | Emmett | 188/370 X |
| 4,233,072 | 11/1980 | Wantanabe et al. | 277/DIG. 6 X |
| 4,239,243 | 12/1980 | Bainard et al. | 277/DIG. 6 X |
| 4,270,442 | 6/1981 | Bainard et al. | 92/168 |
| 4,326,724 | 4/1982 | Gernandt | 277/DIG. 6 X |
| 4,327,925 | 5/1982 | Alexander et al. | 277/212 |

FOREIGN PATENT DOCUMENTS

| 92896 | 11/1983 | European Pat. Off. |  |
| 3111576 | 3/1982 | Fed. Rep. of Germany | 92/168 B |
| 55-30552 | 3/1980 | Japan. |  |
| 58-54237 | 3/1983 | Japan. |  |
| 857832 | 1/1961 | United Kingdom | 384/90 B |
| 1458797 | 12/1976 | United Kingdom | 92/168 |
| 2119874 | 11/1983 | United Kingdom. |  |

Primary Examiner—Douglas C. Butler
Attorney, Agent, or Firm—Larry J. Palguta; Ken C. Decker

[57] ABSTRACT

Disc brake assembly (10) includes a phenolic piston (16) disposed within a bore (14) of a housing (11), the piston (16) movable relative to the housing (11) in order to engage brake shoe pads (18, 20) with the disc (22) of the brake assembly. An interior seal ring (42) and an exterior boot seal (60) are disposed between the bore (14) and piston (16) in order to prevent contaminants from entering into the bore and damaging the phenolic piston. Located between an annular groove (40) receiving the interior seal ring (42) and an exterior opening (50) receiving one end of the exterior boot seal (60), is a land (70). The land (70) is protected by a corrosion resistant barrier (80) which protects the land from oxidation and subsequent lock-up of the phenolic piston (16), and provides a low friction surface for engagement with the slidable piston.

5 Claims, 1 Drawing Sheet

DISC BRAKE CORROSION BARRIER

This is a continuation of application Ser. No. 550,842, filed 11/14/83, now abandoned.

This invention relates to a disc brake corrosion barrier for a land located within the bore of the housing containing the disc brake piston.

Disc brake assemblies include a piston located within a bore of the housing, the piston being inserted within the bore and movable relative to the housing in order to engage the brake shoe pads with the disc of the brake assembly. With the emphasis upon lighter components for automotive vehicles in order to increase mileage and performance, pistons for disc brake assemblies have been manufactured of phenolic materials which produce lightweight, reliable and effective pistons. The phenolic pistons are inexpensive, lighter, and insulate the brake fluid from heat generated during brake operation, the heat generated creating a sufficiently high temperature to boil the brake fluid and thereby create air bubbles in the fluid, which can lead to brake failure.

Phenolic or plastic pistons are widely used in disc brake assemblies. However, the standard disc brake assembly typically includes an interior seal groove located within the mouth or opening of the housing bore, and an exterior boot seal opening located at the bore opening. The interior seal groove and exterior boot seal opening are separated by a land. An interior seal ring is disposed within the interior seal groove and a flexible exterior boot seal has one end received within the exterior boot seal opening, the two seals being separated by the land. The phenolic piston is disposed within the bore, whereby the surface of the piston engages both the interior and exterior seals and the land located therebetween. Although the seals protect the housing bore from contaminant materials, moisture and fluids still enter the bore because either the boot seal is improperly installed, is made of a permeable material, or is damaged during operation. It is common for corrosion to develop on the perimeter or surface of the land. This corrosion buildup engages the surface of the piston during operation of the disc brake assembly, and digs into or gouges the piston surface to the extent that it is not uncommon for the piston to experience "lockup" after braking has ceased. Upon lockup, the piston is held in an extended position which may result in dragging of the brake shoes on the rotor of the disc brake.

Numerous means for sealing the housing bore have been proposed in the prior art. Meyer et al. U.S. Pat. No. 4,039,053 entitled "PROTECTING DEVICE FOR THE CYLINDRICAL SLIDING SURFACES OF A DISC BRAKE" and issued Aug. 2, 1977, discloses an exterior seal device used at the mouth or opening of the bore; Kawaguchi et al. U.S. Pat. No. 4,156,532 entitled, "SEALING DEVICE FOR AN AUTOMOBILE DISC BRAKE" and issued May 29, 1979, discloses a design for the interior annular seal received in the interior seal groove; and flexible disc brake boot seals are disclosed by Brainard et al. U.S. Pat. No. 4,270,442 entitled "DISC BRAKE BOOT", issued June 2, 1981, and Alexander et al. U.S. Pat. No. 4,327,925 entitled "DISC BRAKE BOOT SEAL METHOD AND ARTICLE" and issued May 4, 1982. However, the prior art has failed to provide a solution to the corrosion buildup problem experienced by the land disposed between the interior seal groove and exterior boot seal opening.

The present invention provides a corrosion-resistant barrier which prevents oxidation of the land and subsequent lockup of the phenolic piston, while providing a low-friction surface for engagement with the slidable phenolic piston. A protective barrier is disposed about the perimeter or surface of the land to provide protection from moisture and prevent corrosive buildup, and provide the low-friction surface for engagement with the surface of phenolic piston, to preclude lockup of the piston with the housing bore. The barrier may comprise a flexible annular seal having a U-shaped groove about the circumference thereof, which may be snap fitted into engagement with the land. Alternatively, the protective barrier may be coated onto the perimeter of the land, by spray methods well known in the art. The protective barrier comprises a protective phenolic material such as polytetrafluoroethylene, commonly known as Teflon (R), a registered trademark of E. I. Dupont d'Nemour, & Co.

The invention will be described in detail with reference to the drawings wherein.

Figure 1:
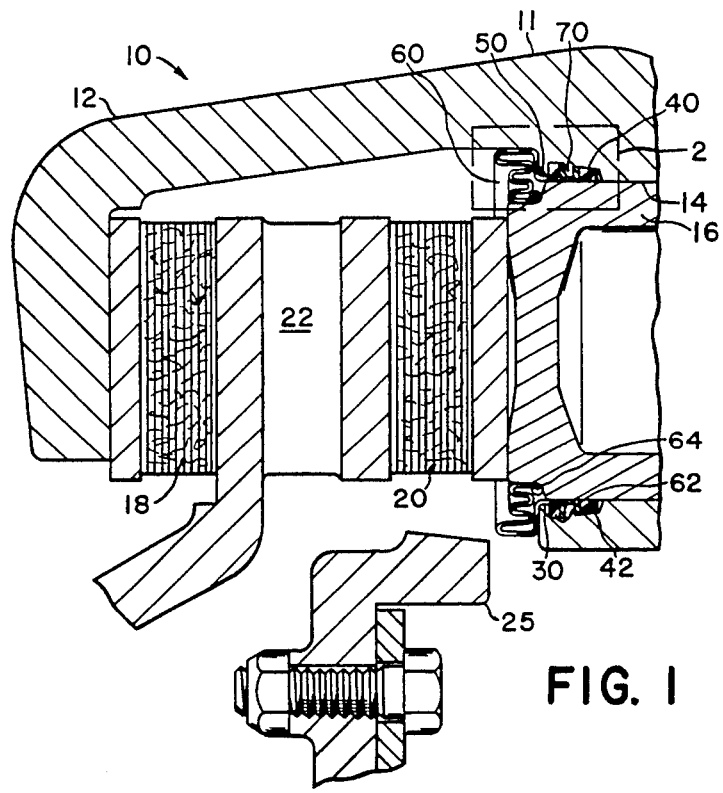
FIG. 1 is a section view of a disc brake assembly.

Referring now to the drawings and in particular to FIG. 1, the disc brake assembly is referenced generally by numeral 10. Disc brake assembly 10 includes a housing 11 with arm 12 extending over a rotor 22 and aligned with a friction element 18. The housing 11 includes a housing bore 14 receiving a piston 16 therein, piston 16 being aligned with a friction element 20. During braking, piston 16 moves toward the rotor 22 to bias the friction element 20 into engagement with the rotor. Reaction forces acting through the arm 12 move the housing 11 to bias the outer friction element 18 into engagement with rotor 22. Engagement of the friction elements with the rotor creates braking torque which is transmitted to a torque plate arm 25.

Housing bore 14 includes an opening 30 with a pair of seal receiving openings located adjacent the opening 30. Located within bore opening 30 is interior seal groove 40 with an annular seal 42 received in groove 40. Exterior boot seal opening 50 is located at bore opening 30 and receives end 62 of flexible boot seal 60. The opposite end 64 of boot seal 60 engages the circumference of piston 16 and is displaced therewith during movement of the piston relative to housing 11. Seal opening 50 and seal groove 40 cooperate to define a land 70 disposed between the opening and groove. The land 70 extends circumferentially about the bore 14, and in prior art designs engages the surface of piston 16. This is a standard construction for many different disc brake assemblies.

Figure 2:
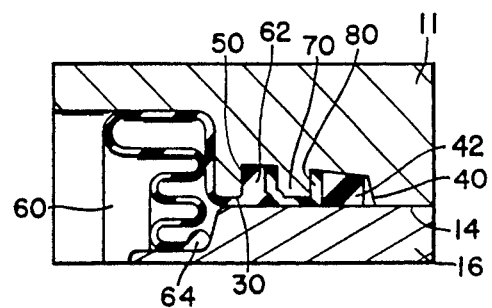
FIG. 2 is an enlarged cross-sectional view taken of the encircled area of FIG. 1.

Disposed about the perimeter or surface of the land 70 is a protective barrier 80. As shown in the enlarged illustration of FIG. 2, protective barrier 80 completely covers the land to provide corrosion protection and a low-friction surface engaging the surface of piston 16. The protective barrier should provide not only low friction engagement with the surface of the piston but also provide complete sealing of the land from moisture and other fluids which would cause oxidation of the land, the subsequent corrosive buildup or oxidation causing a biting into or gouging of the piston surface and piston lockup during or after operation of the disc brake assembly. A phenolic material such as polytetrafluoroethylene, commonly known as TEFLON ®, provides an excellent corrosion-resistant material which effects low-friction engagement with the surface wall of the piston.

Figure 3:
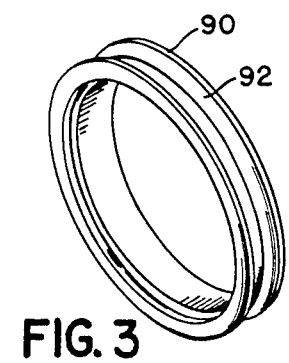
FIG. 3 is an isometric view of a protective annular seal in accordance with the present invention.

FIG. 3 illustrates an embodiment of the protective barrier 80. The barrier may comprise a flexible, annular barrier 90 made of polytetrafluoroethylene and having a U-shaped groove 92 about its circumference. The barrier 90 may be simply snap fitted into engagement with land 70.

Another form of the present invention which will provide complete encasement of the land by a protective barrier such as polytetrafluoroethylene, comprises spraying the protective material onto the land in order to protectively coat it from the effects of oxidation. The spraying may be accomplished by methods well known in the art, utilizing the usual masking techniques to protect the other portions of the bore and housing that are not to be sprayed and protectively coated.

The present invention provides an inexpensive, easily manufactured and assembled protective barrier for protecting the land of a disc brake construction from the deteriorating effects of oxidation, which so often leads to lockup of the piston when braking has ceased. The phenolic material comprising polytetrafluoroethylene may be applied not only by spray coating, but a flexible, annular barrier may be snap fitted into engagement with the land. The protective barrier has sufficient density so that it will not be extruded outwardly by the seals which engage the sides of the protective barrier, and will provide excellent protection from oxidation.

There are many other modifications feasible by one skilled in the art and these modifications are covered by the appended claims.

I claim:

1. In an automotive disc brake assembly having a housing with a piston slidably disposed in an axial bore of the housing, a pair of axially spaced-apart, circumferentially extending inner and outer grooves disposed within said axial bore, a boot seal having a first end received within and positioned by the outer groove, second seal means received within the inner groove, the grooves cooperating to define a land disposed interiorly within the bore between the grooves, the perimeter of said land being encased by a protective, nonmetallic barrier providing corrosion protection for the surface of said land and low friction engagement between said land and the surface of the slidable piston, the first end of the boot seal maintained in the outer groove and engaging the surface of the piston for slidable engagement therebetween, the first end of the boot seal and barrier having a substantially radially extending interface therebetween, the barrier comprising a continuous U-shaped, integral polytetrafluoroethylene ring with one radially extending leg having an axially outermost radial surface abutting a radial surface of the first end of the boot seal in the outer groove to form said interface and another radially extending leg having a radial surface abutting a radial surface of said second seal means.

2. The brake assembly in accordance with claim 1, wherein said protective barrier comprises a flexible annular ring snap-fitted about the perimeter of said land.

3. The brake assembly in accordance with claim 1, wherein said protective barrier is adhesively coated on the perimeter of said land.

4. The brake assembly in accordance with claim 1, wherein said boot seal has a second end engaging a reduced diameter portion of the piston to provide an axially flexible seal for preventing contaminants from entering said axial bore during movement of said piston relative to said housing.

5. The brake assembly in accordance with claim 1, wherein said protective barrier covers the entire perimeter of said land.

* * * * *